United States Patent [19]
Mott

[11] Patent Number: 5,720,684
[45] Date of Patent: Feb. 24, 1998

[54] HYDRAULIC TENSIONER WITH INTERNAL PRESSURE RELIEF

[75] Inventor: Philip J. Mott, Dryden, N.Y.

[73] Assignee: Borg-Warner Automotive, Inc., Sterling Heights, Mich.

[21] Appl. No.: 524,302

[22] Filed: Sep. 6, 1995

[51] Int. Cl.⁶ .................. F16H 7/08; F16H 7/22
[52] U.S. Cl. ............. 474/110; 474/101; 474/109; 474/111
[58] Field of Search .................. 474/101, 109, 474/110, 111, 136

[56] References Cited

U.S. PATENT DOCUMENTS

| | | | |
|---|---|---|---|
| 3,710,634 | 1/1973 | Tamaru et al. | 74/242.11 S |
| 4,507,103 | 3/1985 | Mittermeier . | |
| 4,533,341 | 8/1985 | Yokota | 474/109 |
| 4,539,001 | 9/1985 | Okabe | 474/138 |
| 4,674,996 | 6/1987 | Anno et al. | 474/110 |
| 4,708,696 | 11/1987 | Kimura et al. . | |
| 4,713,043 | 12/1987 | Biedermann . | |
| 4,838,840 | 6/1989 | Mutoh et al. | 474/138 |
| 4,874,352 | 10/1989 | Suzuki . | |
| 4,881,927 | 11/1989 | Suzuki . | |
| 4,963,121 | 10/1990 | Himura et al. | 474/110 |
| 4,986,796 | 1/1991 | Kawashima et al. | 474/101 |
| 4,997,410 | 3/1991 | Polster et al. | 474/110 |
| 5,073,149 | 12/1991 | Maruyama et al. | 474/104 |
| 5,120,278 | 6/1992 | Trzmiel et al. | 474/136 |
| 5,259,820 | 11/1993 | Mott . | |
| 5,277,664 | 1/1994 | Mott . | |
| 5,304,099 | 4/1994 | Deppe et al. | 474/110 |
| 5,346,436 | 9/1994 | Hunter et al. . | |
| 5,441,457 | 8/1995 | Tsutsumi et al. | 474/110 |

FOREIGN PATENT DOCUMENTS

| | | | |
|---|---|---|---|
| 40 35 202 A1 | 5/1991 | Germany | 474/110 |
| 42 07 322 A1 | 9/1993 | Germany | 474/110 |
| 44 22 445 A1 | 1/1995 | Germany | 474/110 |
| 1-229152 | 9/1989 | Japan | 474/110 |
| 2 262 323 | 6/1993 | United Kingdom | 474/110 |

Primary Examiner—David J. Bagnell
Assistant Examiner—Gary S. Hartmann
Attorney, Agent, or Firm—Hugh A. Abrams, Esq.; Greg Dziegielewski

[57] ABSTRACT

A hydraulic tensioner having a hollow plunger slidably fitted in a cavity in a housing and biased in a protruding direction by a spring and fluid. A check valve permits fluid to only flow into the cavity, and thereby protrude the plunger, but not out of the cavity. A sleeve slidably fits within the plunger hollow forming a small clearance between the lower end of the plunger and sleeve. The plunger is made of an elastic material capable of expanding in diameter upon increases in internal pressure to permit increased fluid flow through the increased clearance and thus release cavity fluid pressure to allow the plunger to recede into the cavity.

15 Claims, 1 Drawing Sheet

HYDRAULIC TENSIONER WITH INTERNAL PRESSURE RELIEF

FIELD OF THE INVENTION

This invention relates to hydraulic tensioners, and particularly to a hydraulic tensioner having a spring and fluid actuated plunger which is useful for constantly imparting and maintaining tension to wrapped power transmission devices such as chains, belts and the like. The invention is more particularly directed to such a hydraulic tensioner having an expanding clearance plunger in which pressure causes the leakage clearance to increase so as to reduce pressure in the tensioner hydraulic chamber.

BACKGROUND OF THE INVENTION

Tensioning devices, such as hydraulic tensioners, are used as a control device for a power transmission chain, or any similar power transmission devices, as the chain travels between a plurality of sprockets. Generally, it is important to impart and maintain a certain degree of tension to the chain to prevent noises, or the unmeshing of teeth in cases of a toothed chain. Prevention of such unmeshing is especially important in the case of a chain driven camshaft in an internal combustion engine because jumping of teeth will throw off the camshaft timing by several degrees, possibly rendering the engine inoperative or causing damage. However, in the harsh environment in which an internal combustion engine operates, chain tension can vary between excessively high or low levels as a result of the wide variations in temperature and differences between the coefficients of linear expansion among the various parts of the engine, including the chain and the tensioner. Moreover, wear to the chain components, during prolonged use, can result in a decrease in the tension of the chain. It is also necessary to provide some measures to remove excessive tensioning forces on the tight side of the chain and to insure the necessary tension forces on the slack side of the chain. In addition, camshaft and crankshaft induced torsional vibrations cause belt tension to vary considerably. This tension variation results in chain elongation.

One example of a device used to control tension in a wrapped power transmission device is described in Biedermann, U.S. Pat. No. 4,713,043. Biedermann discloses a hydraulic ball-type check valve tensioner having a plunger slidably fitted into a chamber and biased by a spring in a protruding direction. The plunger extends against a lever arm that imparts tension to a chain according to the degree of slackening of the chain. A clearance, which is formed between the ball and seat of a check valve, permits the free flow of fluid therethrough. Therefore, the hydraulic pressure from an external source, such as an oil pump or the like, flows into a chamber through passages formed in the housing, advancing the plunger easily by the combined efforts of the hydraulic pressure and the spring force.

On the other hand, when the plunger tends to move in a reverse direction, the ball check tightly contacts the ball seat to restrict outflow of fluid from the chamber. Only a small clearance between the plunger and the housing wall permits some fluid to escape thereby allowing the plunger to retract. In such a fashion, the tensioner achieves a so-called no-return function, i.e., movements are easy in one direction but difficult in the reverse direction.

However, this no-return function may present difficulties in accommodating tension spikes or surges in the chain, belt or similar wrapped power transmission devices. For example, when a timing device operates at a certain speed and tension level, it can achieve a longitudinal resonance. At resonance, the mean chain tension increases significantly. The small clearance between the plunger and the housing wall is not sufficient to quickly release the hydraulic fluid in the chamber to accommodate the sudden overload of the chain.

One example of an attempt to alleviate this problem in a hydraulic tensioner is described in Suzuki, U.S. Pat. No. 4,881,927. Suzuki discloses a hydraulic ball-type check valve tensioner having a plunger slidably fitted into a chamber and biased by a spring in a protruding direction. This tensioner includes a relief valve having a sleeve slidably fitted in an auxiliary chamber in communication with the first chamber, with a spring biasing the sleeve into a depressed position to block a discharge part. Oil in the first chamber flows into the auxiliary chamber to force the sleeve against the biasing spring action to unblock the discharge port. Unfortunately, this relief valve may be slow to open and close due to high mass and subject to variable friction between the sleeve and auxiliary chamber wall. This may vary the pressure at which the relief valve operates.

Another example of an attempt to provide a hydraulic tensioner with a relief valve is described in Mittermeier, U.S. Pat. No. 4,507,103. Mittermeier discloses a hydraulic ball-type check valve tensioner having a plunger slidably fitted into a chamber and biased by a spring in a protruding direction. This tensioner includes a relief valve in a bore at the protruding end of the plunger. This relief valve is a spring-biased ball type valve with the spring set against a threaded throttle plug capping the bore. Oil in the chamber forces open the ball, upon reaching a set high pressure, and flows into the bore, past the throttle plug threads to the atmosphere. Unfortunately, this relief valve may be slow to release large displacements of oil because of the restricted path past the threads and resultant back-pressure build up against the ball.

One disadvantage in common with both of these prior art tensioners is that they rely upon relief valves that only relieve pressure at predetermined set values. The tension on the chain must reach a maximum level before the back pressure in the tensioner chamber forces open the relief valve. The chain is subject to wide variations in tension because of the on-off characteristic of the relief valves causing a wide dead-band in the tensioner dynamic response to excessive loads.

Accordingly, it is an object of the present invention to provide a tensioner for chain, belt or similar wrapped power transmission devices which can maintain a substantially constant tensioning force.

It is also an object of the present invention to provide a hydraulic tensioner with a pressure relieving system to allow the plunger to return when excessive loads are seen by the chain.

It is also a further object of the present invention to provide a hydraulic tensioner with a pressure relieving system that provides a smooth frequency response.

SUMMARY OF THE INVENTION

The present invention is directed to a hydraulic chain tensioner having an internal pressure relief system. According to one aspect of the present invention, there is provided a tensioner for a wrapped power transmission device, e.g. a chain linking at least two rotating members such as a pair of sprockets. A hollow plunger, internally provided with a fluid chamber, slidably fits within a mounting cavity in a housing.

A spring is provided to bias the plunger in a protruding direction towards the chain. A check valve having a variable orifice is provided between the housing and fluid chamber to permit fluid to flow into the fluid chamber of the plunger while blocking flow in the opposite direction. This check valve blocks outflows of fluid when a load is applied to the plunger by a chain, or other type of wrapped power transmission device, in a direction opposite to the biasing direction, thereby increasing the fluid pressure in the chamber. The check valve seat has an extended sleeve slidably fitting in the hollow interior of the plunger. Increased pressure in the plunger interior causes the clearance between the plunger and sleeve to expand allowing increased fluid leakage. The increased leakage permits self-adjusting pressure relief over a range of chain loads.

In a preferred embodiment of the present invention, the plunger is cylindrical and made at least partially of an elastic material so that increased pressure will cause a radial expansion of the plunger away from the extended sleeve. Increased leakage of hydraulic fluid between the plunger and sleeve may exit the cavity through an exhaust passageway to an oil reservoir, thereby relieving pressure built-up against the plunger to permit it to recede into the cavity.

DETAILED DESCRIPTION OF THE PRESENTLY PREFERRED EMBODIMENTS

Figure 1:
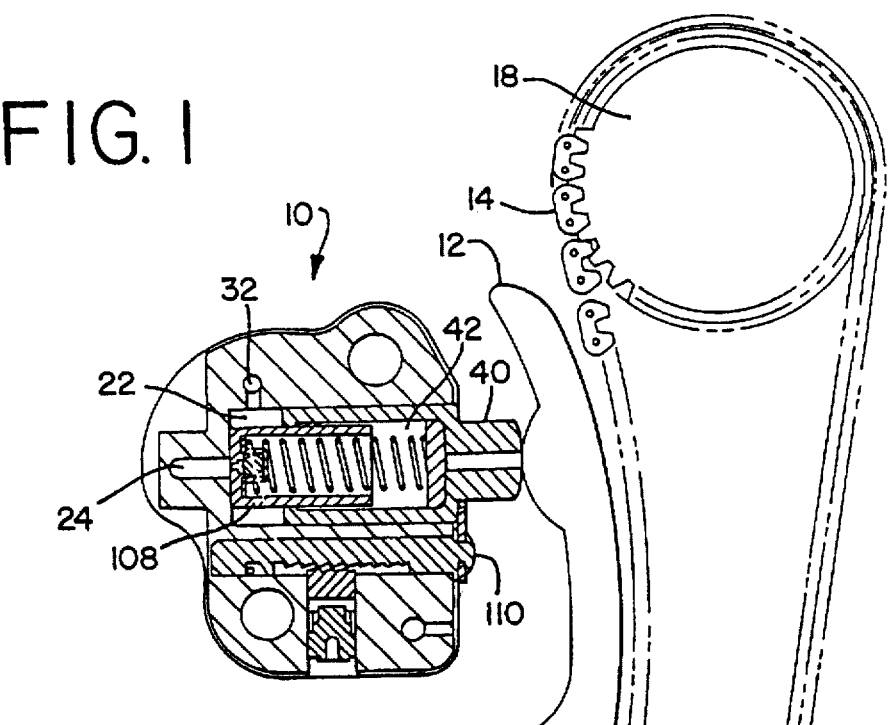
FIG. 1 is an elevation view of a hydraulic ball-type check valve tensioner with one embodiment of the expanding clearance plunger illustrating the internal components.

Turning now to the drawings, FIG. 1 illustrates a preferred embodiment of the hydraulic tensioner 10 incorporating the pressure relieving system of the present invention, as depicted next to a tensioner arm 12 applying tension to a chain 14, such as from an overhead cam timing drive. A typical overhead cam timing drive consists of a crank sprocket 16, a cam sprocket 18, a chain 14, a hydraulic tensioner 10, a tensioner arm 12 and a chain guide (not shown) opposite the tensioner arm. The chain guide is typically located on the "tight strand" or driving side, of the chain. The tensioner arm 12 and tensioner 10 are then located on the "slack strand" of the chain. The tensioner 10 includes a housing 20 with a chamber 22, or piston bore, an extended sleeve 108 in the chamber, and a plunger 40, or piston, protruding from the housing to push a pivoting tensioner arm 12 against the chain to take up slack and keep the chain at some minimum tension value for good chain control.

Figure 2:
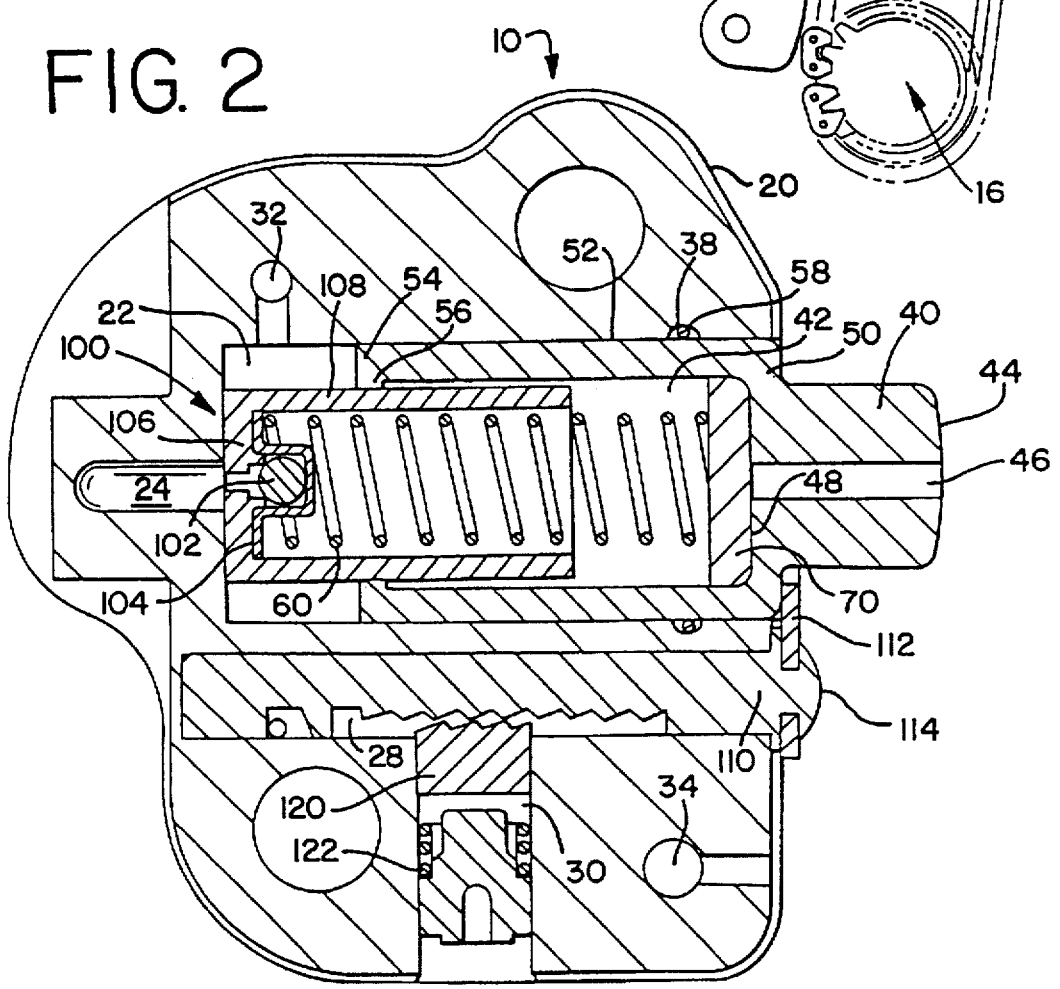
FIG. 2 is a more detailed view of the hydraulic tensioner of FIG. 1.

Referring now to FIG. 2, a more detailed view illustrates the internal working components of the tensioner 10. The tensioner housing 20 includes a chamber 22. Preferably, the chamber 22 is a cylindrical bore. The chamber slidably receives a hollow plunger 40, preferably cylindrical, having a lower end 54, or cylindrical outer portion, with an inner ring 56, and an upper end 44 with an optional aperture 46. This cylindrical outer member 54 defines an interior space 42. A cylindrical spring 60 fits in the interior space 42 and contacts the inside of the upper end 48 to bias the plunger 40 in a direction protruding from the housing 20 toward a wrapped power transmission device. A plunger seal ring 58 is provided in a seal ring groove 38 in the chamber wall 52. The seal ring 58 prevents leakage of fluid outward along the side of the plunger 40. The seal ring 58 also allows use of an oversize chamber bore to provide sufficient clearance between the outer portion 54 of the plunger and the chamber wall 52 for the outer portion to radially expand during operation. If the aperture 46 is present, a vent disk 70 is positioned in the interior space 42 against the inside of the upper end 48 of the plunger.

The housing 20 is provided with a passage-way 24 at the bottom of the chamber 22 to connect the chamber with a source of fluid pressure (not shown). The source of fluid pressure may be a reservoir, oil pump, or the like. In one embodiment of the tensioner, a check valve 100 is provided between the chamber and the passageway to permit fluid flow from the source of fluid pressure into the chamber while blocking fluid flow in the reverse direction. Preferably, the check valve 100 includes a ball 102 and a spring 104 biasing the ball toward a ball seat 106. In another embodiment, the check valve may be a variable orifice check valve as shown and described in U.S. Pat. No. 5,259,820 and U.S. Pat. No. 5,277,664 both of which are owned by the assignee of the present application and both of which are incorporated herein by reference.

In either case, the check valve ball seat 106 has a sleeve 108 extending up therefrom into the interior space 42 of the plunger. The sleeve 108 is preferably cylindrical and slidably fits within the plunger. There exists a small clearance between the outer wall of the sleeve 108 and the inner diameter of the ring 56 at the lower end 54 of the plunger. The clearance may be on the order of about 0.02 mm when there is atmospheric pressure in the tensioner. The plunger should preferably be made of an elastic material, such as a plastic, that is able to stretch under pressure. The inside diameter of the ring 56 may be less than the outside diameter of the sleeve 108 so that the plunger needs to be radially stretched to fit over the sleeve. By radially stressing the plunger, a preload is applied against the sleeve. A minimum threshold pressure must be realized in the interior space 42 before the pressure forces the plunger to radially expand and increase the leakage clearance between the lower end ring and the sleeve.

In another embodiment, the sleeve 108 may be separate from the check valve ball seat 106. The sleeve should seal against the bottom of the chamber 22 to maintain the fluid within the interior 42 of the plunger. A sleeve that is integrally formed with the housing 20 would be another alternative embodiment.

In yet another embodiment, as shown in FIG. 2, the tensioner includes a rack and ratchet assembly to provide mechanical no-return limiter function. The housing 20 is provided with a longitudinal port 28 parallel to the chamber 22 to receive a rack 110 that is outwardly movable within the port 28. The rack 110 is associated with the plunger 40 so that as the plunger moves outward, the rack also moves outward. The ratchet 120 and spring 122 are in a lateral cavity 30 opening into the longitudinal port 28. The spring 122 biases the ratchet into meshing arrangement to provide the mechanical no-return limiter function. Alternative embodiments and the operation of this rack and ratchet assembly are described in U.S. Pat. No. 5,346,436 which is owned by the assignee of the present application and is incorporated herein by reference.

In operation, when the plunger 40 is being stressed inward by tightening of the chain 14, a very hard resistance can be noticed because the interior space 42 is completely filled with an incompressible fluid. In the case of low pressures building up in the interior 42, there may be some leakage of fluid through the clearance between the plunger lower end 54 and the outer wall of the sleeve 108. However, this leakage is minor and will not relieve rapid increases in pressure.

When the pressure increases to higher levels, the force of the fluid acting on the plunger 40 will cause it to expand. As the diameter of the lower end 54 increases, the clearance also increases to permit more fluid leakage to occur. This fluid leakage will moderate increases in pressure. However, with rapid increases in pressure, the leakage will not be sufficient until the pressure reaches a level to force the clearance to increase to a sufficient size to permit the quantity of fluid to flow out of the plunger interior 42 to balance the chain load forcing the plunger back into the chamber. The resulting increased clearance between the plunger and sleeve allows increased flow of fluid out through the exhaust passageway 32 to the fluid reservoir. Thereby, the pressure inside the plunger is relieved in a self-adjusting manner proportionate to the internal pressure levels caused by excessive loads on the chain.

At certain speeds and tensions in the chain, a longitudinal resonance may be induced that results in increased mean tension in the chain. At this high tension level, chain stiffness is linear, which, it is believed, induces or reinforces the resonance. The present invention, by use of variable pressure relief area, helps to avoid excess pressure in the tensioner, thereby reducing tension in the chain. By maintaining the chain at lower tension levels, the chain operates in a non-linear stiffness region, which tends to help avoid resonance from occurring.

The plunger can be designed with predetermined expansion characteristics so that the leakage clearance will increase sufficiently so that a maximum predetermined load on the chain is not exceeded. Likewise, the expansion characteristics of the plunger may be designed to provide a smooth frequency response to anticipated chain loads across the spectrum of operating engine r.p.m.'s. The material of the plunger, the thickness of the plunger and diameter of the plunger may be important parameters to consider in designing for optimum performance. The clearance between the plunger 40 and the chamber wall 52 may be advantageously set so that the chamber wall acts as an expansion limiter to limit the internal stress on the plunger.

One of the advantages of the present invention is that the tensioner pressure may be relieved, rather than only at a predetermined set value, over a broad range of pressure conditions. This allows for a tensioner with smooth frequency response that proportionately dampens changes in the chain loads. Another advantage is the self-regulating characteristic of this pressure relieving system so that at low chain loads the clearance and resultant fluid leakage is minimal, but at high chain loads the clearance and resultant fluid leakage is greater in response to the pressure relieving demand.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner for a wrapped power transmission device between two rotating members, comprising:
   a housing with a fluid chamber, said chamber communicating with an external source of pressurized fluid,
   a hollow sleeve positioned within said chamber,
   a hollow plunger positioned within said chamber and capable of extending outward therefrom for bearing against a power transmission device to regulate tension between rotating members, said plunger having a cylindrical outside portion defining an interior space and positioned radially outwardly from and against said sleeve within said interior space, said plunger outside portion being capable of small movement radially away from contact with said sleeve under specified pressure conditions in said interior space,
   a spring member in said chamber biasing said plunger in a direction extending from said chamber,
   a check valve positioned to allow the transfer of pressurized fluid from said source of pressurized fluid to said interior space through said sleeve and to block the transfer of fluid from said interior space to said source,
   a conduit in fluid communication with said chamber to permit passage of fluid from said interior space and through a clearance formed between said plunger outside portion and said sleeve under said specified pressure conditions in said interior space.

2. The tensioner of claim 1 wherein said plunger outer member is formed of flexible material to permit said radial movement of said plunger outer member.

3. The tensioner of claim 2 wherein said flexible material provides a specified level of preload force of said plunger outer member against said sleeve.

4. The tensioner of claim 2 wherein said plunger outer member has an expandable inner ring against said sleeve.

5. The tensioner of claim 2 wherein said sleeve further comprises a cylindrical member that extends upwardly into said interior space, said spring member being located within said sleeve.

6. The tensioner of claim 1 wherein said conduit permits passage of fluid from said chamber into said source of pressurized fluid.

7. In a hydraulic tensioner having a housing with a first fluid chamber and a second fluid chamber, said second chamber communicating with an external source of pressurized fluid, said tensioner having a hollow plunger positioned within said first chamber and biased in a direction extending therefrom by a spring member, said tensioner having a check valve positioned to allow the transfer of pressurized fluid from said second chamber to said hollow plunger in said first chamber, and said tensioner having a pressure relief system to permit release of pressurized fluid from said hollow plunger under specified pressure conditions, said pressure relief system comprising:
   a cylindrical sleeve within said first chamber, wherein said hollow plunger has a cylindrical outside portion positioned radially outwardly from and against said sleeve, said plunger outside portion being capable of small movement radially away from contact with said sleeve under specified pressure conditions in said hollow plunger to permit fluid transfer from said hollow plunger through a clearance formed between said plunger outside portion and said sleeve under said specified pressure conditions.

8. The tensioner of claim 7 wherein said housing has a conduit therethrough in fluid communication with said first chamber to permit transfer of fluid relieved from said hollow plunger.

9. A hydraulic chain tensioner comprising:

a housing having a fluid chamber, an inlet passageway, and an exhaust passageway in communication with said fluid chamber;

a hollow plunger slidably received within the fluid chamber, said plunger having a lower end defining an interior space;

a spring biasing the plunger in a direction extending from the fluid chamber;

a cylindrical sleeve in the fluid chamber positioned around said inlet passageway, said sleeve extending upwards from said inlet passageway into said plunger interior space, with said plunger lower end positioned radially outward from said sleeve.

10. The tensioner of claim 9 wherein said lower end of said plunger is capable of radially expanding under the influence of more than a predetermined pressure in said interior space.

11. The tensioner of claim 9 wherein said plunger includes an inner ring at said lower portion, said inner ring positioned adjacent said sleeve.

12. The tensioner of claim 9 wherein said sleeve is integrally formed with said housing.

13. The tensioner of claim 9 wherein said exhaust passageway communicates with said fluid chamber at a position in said housing radially outward from said sleeve and below said lower end of said plunger such that fluid may transfer from said interior space to the exhaust passageway through a gap formed between said sleeve and said lower end.

14. The tensioner of claim 9 further comprising a check valve in the fluid chamber positioned in said sleeve at the inlet passageway.

15. The tensioner of claim 14 wherein said sleeve is integrally formed with said check valve.

* * * * *